April 23, 1940.                 J. SEABO ET AL                 2,197,881
                                SKID CHAIN LINK
                              Filed Dec. 21, 1939
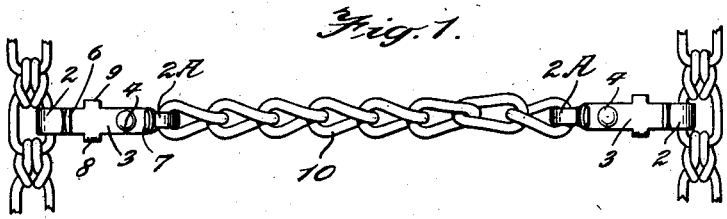
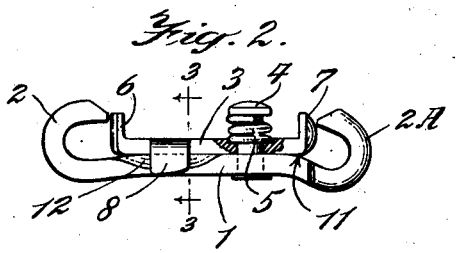  
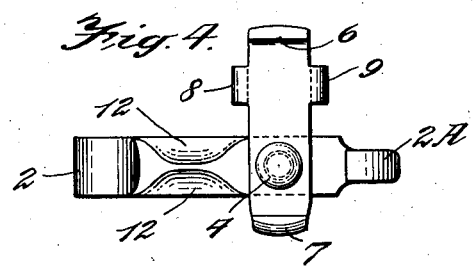  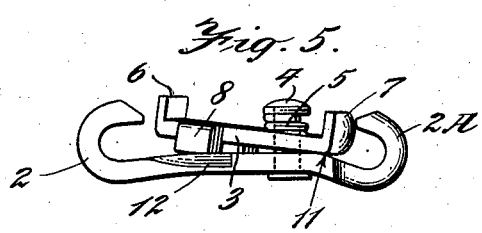
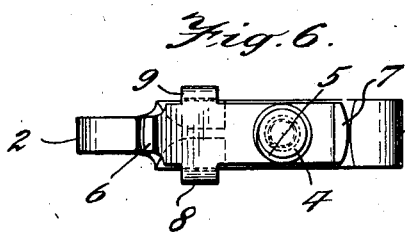  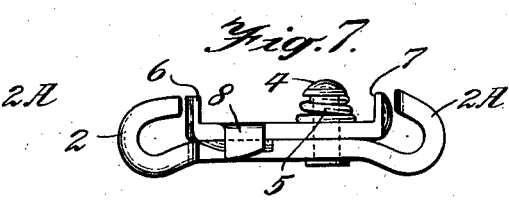
INVENTORS
James Seabo, Louis J. Snyder
BY Joseph V. Meigs
ATTORNEY.

Patented Apr. 23, 1940

2,197,881

UNITED STATES PATENT OFFICE 2,197,881

SKID CHAIN LINK

James Seabo and Louis J. Snyder, Hastings on Hudson, N. Y.

Application December 21, 1939, Serial No. 310,354

1 Claim. (Cl. 59—89)

This invention relates to a fastener for use in connecting the cross chains and the side chains of antiskid devices used on tires of vehicles such as the automobile.

As now employed the cross chains are joined to the side chains by links which can be removed or opened only with great difficulty. Consequently, when, as frequently happens, a cross chain becomes worn through, the replacement or repair thereof is not a conveniently and easily performed operation.

It is an object of the present invention to provide a fastener which enables a new cross chain to be quickly and easily substituted for a worn-out one.

It is a further object to provide a fastener which is dependable in use, which remains securely locked in use, which can be easily opened and which can be economically manufactured.

Other objects and advantages will appear from the following description taken in conjunction with the accompanying drawing, in which Fig. 1 shows a section of the side chains connected by a cross chain;

Fig. 2 shows a side view, partly in section, of the fastener;

Fig. 3 is a section on line 3—3 of Fig. 2;

Fig. 4 is a plan view showing the latch member rotated through an angle of about 90 degrees in a plane parallel to the plane of the body member;

Fig. 5 shows the latch member rotated in a plane perpendicular to the above mentioned plane and performing its leverage function;

Fig. 6 shows a plan view of the latch member and body member in locked position; and Fig. 7 shows a side view of the fastener.

The body member is elongated, has a portion 1 lying in a plane and end portions forming hooks 2, 2A. The latch member has a portion 3 which lies in a plane parallel to the plane of the portion 1 of the body member. Intermediate the ends of the latch member is a stud or pivot 4 which may be carried by the body member. This latch member is rotatably mounted on the stud 4 for rotation in a plane parallel to the plane of the portion 1 of the body member. The stud is mounted at a point not only intermediate the ends of the latch member but also nearer one end thereof than the other. A spring 5 acts to yieldably force the latch member into engagement with the body member. At each end of the latch member there are upstanding portions 6 and 7 which in the position shown in Figs. 2, 6 and 7, form closures in cooperation with the hooks 2.

The latch also has depending lateral members or flanges 8, 9, which engage the body member in locking engagement therewith as shown in Figs. 1, 2, 6 and 7, while at the same time the member 6 and 7 come into juxtaposition with the hooks 2 and form closures. The stud 4 passes through an opening in the latch, which opening is sufficient in diameter to permit rotation of the latch member in a plane containing the axis of said stud 4 (perpendicular to the aforesaid planes) as will presently be described.

The operation of the device will now be described. Let it be assumed, for example, that the fastener is mounted as shown in Fig. 1, that the chain 10 has become worn out and that it is desired to substitute a new chain.

Referring to Fig. 1, for example, the latch is grasped at the end 6 and is employed as a lever. For this purpose it is rotated in the plane which contains the axis of the stud 4 about the fulcrum 11 and against the force exerted by the spring 5, through an angular distance sufficient to enable the lateral depending flanges or lugs 8 and 9 to be freed from their locking engagement with the body portion 1, the opening in the latch member through which the stud 4 passes being of sufficient diameter to permit this rotation. Then the latch member is rotated about the axis of the stud 4 and in a plane transverse to said axis and through an angular distance sufficient to open the closures formed by the juxtaposition of the ends 6 and 7 with the hooks 2, 2A. The rotation of the latch first in a plane containing the axis of the stud 4 about the point 11 as a fulcrum and then in a plane transverse to this axis is clearly shown in Fig. 5. If desired, the rotation may be as far, in the latter plane, as shown in Fig. 4.

When the closures formed by the hooks 2, 2A and the juxtaposed ends 6, 7 of the latch have thus been opened, the damaged or broken chain 10 may be readily removed, and a new one substituted. The latch is then rotated so as to return the ends 6 and 7 into juxtaposition with the hooks 2 and 2A, whereupon the spring 5 forces the depending flanges 8, 9 into engagement with the portion 1 of the body member and the parts remain dependably in this engagement.

To facilitate the riding of the depending flanges over the edges of the body portion, bevelled portions 12 may be provided and the flanges may be complementarily shaped, as shown in Figs. 2, 3, 4, 5, 6 and 7.

The principle of the invention may be embodied in forms different from those specifically shown and described and said principle will be defined in the claim appended hereto.

What we claim is:

A fastener for an antiskid device cross chain comprising an elongated body member having portions lying in a plane and hook portions at each end; an elongated latch member having a portion lying in a plane parallel to said first mentioned plane and mounted in engagement with said body portion; pivotal means connecting said body and latch portions at a point intermediate the ends of the latch member and nearer one end than the other and enabling the latch member to rotate in said plane and also in a plane perpendicular thereto; said latch member having depending lateral members adapted to yieldably lock said latch member in engagement with said body member and end portions complementary to and forming closures with said hook members when the latch member is yieldably locked in engagement with the body member and the ends of the latch members are simultaneously brought into juxtaposition with the hook member; yieldable means carried by said pivotal means and tending to force said latch member into engagement with said body portion whereby the latch member functions as a lever having long and short arms equal to the respective distances from the axis of the pivotal means to the respective ends of the latch member, and a fulcrum at the end of the short arm; whereby said latch member may be rotated about the fulcrum in said perpendicular plane through an angular distance sufficient to enable said depending lateral members to be disengaged from their locking engagement with the body member and then rotated about the axis of the pivotal means through an angular distance sufficient to open the closure formed by the ends of the latch member and hook members.

JAMES SEABO.
LOUIS J. SNYDER.